July 12, 1960    M. DE GROOTE ET AL    2,945,023
CERTAIN OXYALKYLATED SUCROSES AND METHOD OF MAKING SAME
Original Filed May 24, 1954
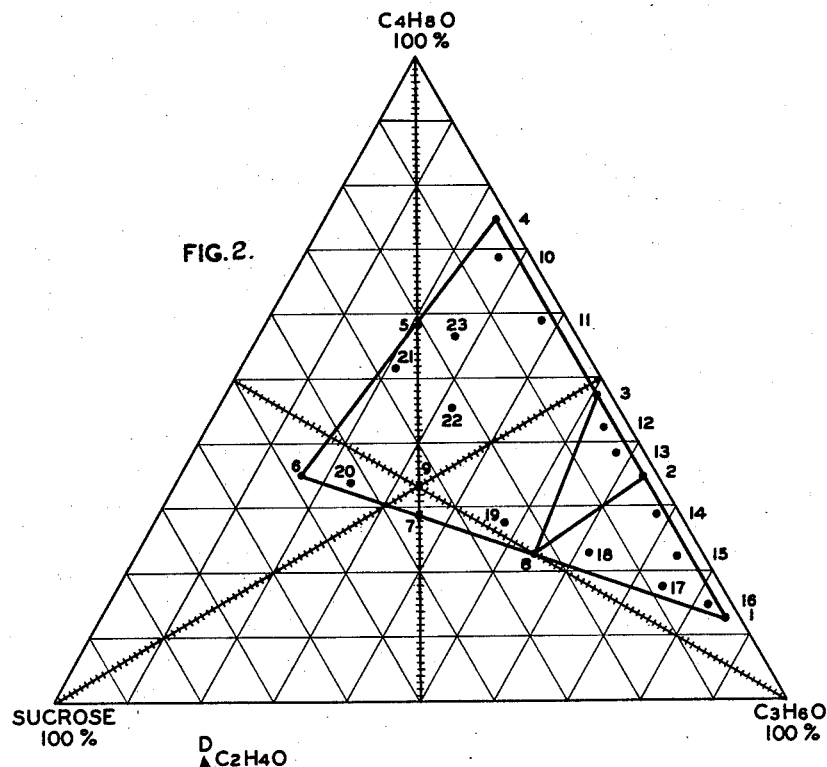
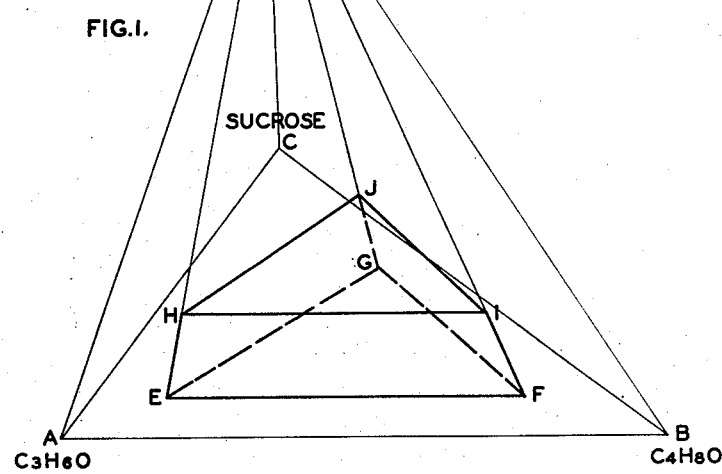

2,945,023

CERTAIN OXYALKYLATED SUCROSES AND METHOD OF MAKING SAME

Melvin De Groote, St. Louis, and Owen H. Pettingill, Kirkwood, Mo., assignors to Petrolite Corporation, Wilmington, Del., a corporation of Delaware Original application May 24, 1954, Ser. No. 431,782, now Patent No. 2,819,215, dated Jan. 7, 1958. Divided and this application Apr. 10, 1957, Ser. No. 651,846

7 Claims. (Cl. 260—209)

This application is a division of our copending application Serial No. 431,782, filed May 24, 1954, now U.S. Patent 2,819,215.

Our invention is concerned with new chemical products or compounds useful as demulsifying agents in processes or procedures particularly adapted for preventing, breaking or resolving emulsions of the water-in-oil type and particularly petroleum emulsions. Our invention is also concerned with the application of such chemical products or compounds in various other arts and industries as well as with methods of manufacturing the new chemical products or compounds which are of outstanding value in demulsification.

More specifically then, the present invention is concerned with a cogeneric mixture of a homologous series of glycol ethers of sucrose. The cogeneric mixture is derived exclusively from sucrose, ethylene oxide, propylene oxide and butylene oxide, in such weight proportions so the average composition of said cogeneric mixture in terms of the initial reactants lies approximately within the truncated triangular pyramid identified as E, H, F, I, G and J in Figure 1; with the proviso that the percentage of ethylene oxide, by weight, is within the limits of 2% to 39.5% and the remaining three initial reactants recalculated to 100% basis lie approximately within the triangular area defined in Figure 2 by points 1, 4 and 6. However, as will be pointed out subsequently, the same ultimate compositions may be employed using any one of the three oxides last.

The oxyalkylation of sucrose by means of ethylene oxide, propylene oxide, or butylene oxide has been described in the literature. One can use instead of the oxides the corresponding alkylene carbonates, to wit, ethylene carbonate, propylene carbonate, or butylene carbonate.

As is well known, the oxyalkylation derivatives from any oxyalkylation-susceptible compound, are prepared by the addition reaction between such oxides and such compound. The addition reaction is advantageously carried out at an elevated temperature and pressure and in the presence of a small amount of alkaline catalyst. Usually, the catalyst is sodium hydroxide or sodium methylate. The reaction temperature is apt to be 140° C. or somewhat less and the reaction pressure not in excess of 30 to 50 pounds per square inch.

As to further information in regard to the mechanical steps involved in oxalkylation, see U.S. Patent No. 2,499,365, dated March 7, 1950, to De Groote et al. Particular reference is made to columns 92 et seq.

The oxyalkylation of a liquid or a solid which can be melted at comparatively low temperature (under 150° C.) without decomposition or is soluble in an inert solvent, such as xylene, presents little or no mechanical difficulties in the oxyalkylation step. When one has a solid which cannot be melted, or decomposes on melting, and is insoluble in xylene, a slurry may be employed as in the case of the oxyalkylation of sucrose. See U.S. Patent No. 2,652,394, dated September 15, 1953, to De Groote.

The oxyalkylation of sucrose can be accomplished in a number of ways and the particular procedure employed is immaterial. Specific reference is made to the instant application which is concerned with ethylene oxide, and butylene oxide, or the equivalents. Actually, whether one uses ethylene oxide or butylene oxide, or, for that matter, propylene oxide, one preferably starts with either the powdered sucrose suspended as a slurry in xylene or a similar inactive solvent; or one employs an alkylene carbonate such as ethylene carbonate, butylene carbonate, or propylene carbonate, for the initial oxyalkylation. When such initial oxyalkylation has gone far enough to convert the solid mass into a product which is at least liquid at oxyalkylation temperature, it can be subjected to the oxides as differentiated from the carbonates. The carbonates, of course, cost more than the oxides.

When butylene oxide is used, the same procedure can be followed as in the use of propylene oxide or ethylene oxide as described in aforementioned U.S. Patent No. 2,652,394, dated September 15, 1953, to De Groote. Indeed, the oxyalkylation of sucrose is substantially comparable to the oxyalkylation of sorbitol, particularly if one uses powdered sorbitol in the form of a slurry. Such slurry is the equivalent of a slurry of powdered sucrose.

Referring momentarily to oxyalkylation of sucrose, various suitable procedures are well known. In the case of butylene oxide, the same procedure can be employed as in the use of propylene oxide in the oxypropylation of sorbitol as described in U.S. Patent No. 2,552,528, dated May 15, 1951, to De Groote. Although this patent describes the use of molten sorbitol, one can substitute a slurry of solid sorbitol, or for that matter a slurry of solid sucrose, and proceed in identically the same manner. Indeed, we have used indentically the same procedure starting with finely powdered sucrose as a slurry in about one-half its weight of xylene. Instead of using 1600 grams of propylene oxide there was used instead 1800 grams of butylene oxide (mixed straight chain isomers).

In Example B, instead of using 1100 grams of the propylene oxide derived intermediate from Example A, preceding, there was used instead 1191 grams of the butylene oxide derived intermediate, Example A. Instead of using 1327 grams of propylene oxide there was added 1493 grams of butylene oxide.

In Example C, instead of using 1149 grams of propylene oxide derived intermediate Example B, from the preceding example, there was used instead 1271 grams of butylene oxide derived intermediate B. Instead of adding 1995 grams of propylene oxide in this stage, there was added instead 2345 grams of butylene oxide.

In Example D, instead of 743 grams of the propylene oxide derived intermediate from Example C, preceding, there was used 831 grams of the butylene oxide derived intermediate. Instead of adding 637 grams of propylene oxide in this stage, there was added 717 grams of butylene oxide.

It will be noted at this stage the ratio of butylene oxide to sucrose was approximately 100-to-1, and the amount of sucrose represents less than 3%, by weight, of the end product and the amount of butylene oxide represented over 97%.

Example E was conducted in the same manner except that the initial reactant was Example D, preceding, and instead of using 566 grams, there was used instead 628 grams of the reactant. Instead of adding 563 grams of propylene oxide, there was added instead 633 grams of butylene oxide.

In this last example, five grams of sodium methylate were added as a catalyst to speed up the final stage of reaction. Operating conditions, such as temperature, time factor, etc., were substantially the same as described in the corresponding Examples A, B, D, C, and E, in aforementioned U.S. Patent 2,552,528.

It will be noted that in this final product approximately 200 moles of butylene oxide were employed per mole of sucrose. On a percentage basis, the products represented approximately 1% sucrose and 99% butylene oxide.

All examples, except the first stage, were substantially water-insoluble and xylene soluble.

It is immaterial in what order the oxides are added to sucrose so as to obtain the herein described products. However, our preference is to add butylene oxide first, then propylene oxide, and then ethylene oxide. There are two advantages in so doing. The first advantage is that products obtained as far as the general average goes following this succession of oxides appears to give the most valuable product. Secondly, it is easier from a purely manipulative standpoint to oxybutylate molten sucrose than to oxyethylation. There is less pressure on the autoclave than in oxyethylation. However, oxyethylation can be conducted perfectly satisfactorily.

So far as the use of butylene oxide is concerned we prefer to use the straight chain isomers.

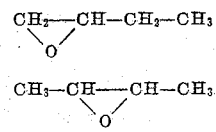

or a mixture of the two.

As noted previously, one can oxyethylate first and then add either one of the other two oxides, to wit, butylene oxide or propylene oxide. Similarly, one can add either oxide first, that is, propylene oxide or butylene oxide, and then add ethylene oxide, followed by the addition of the other oxide. Also, as is obvious, one need not add all the ethylene oxide alone or all the butylene oxide alone or all the propylene oxide alone. One could make a mixture of either one of the two, or all three, and use such mixture or mixtures as an oxyalkylation agent. Furthermore, one can add a fraction of any particular oxide and then add the rest at a subsequent stage. This may be applied not only to a single oxide but also to two of the three, or all three, of the oxides employed.

The products of the present invention are also useful for various purposes other than the resolution of petroleum emulsions of the water-in-oil type.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents as, for example, for cosmetics, spray oils, water-repellent textile finishes; as lubricants, etc.

For the purpose of resolving petroleum emulsions of the water-in-oil type, and also for that matter for numerous other purposes where surface-active materials are effective, and particularly for those uses specified elsewhere herein, we prefer to employ oxyalkylated derivatives, which are obtained by the use of monoepoxides, in such manner that the derivatives so obtained have sufficient hydrophile character to meet at least the test set forth in U.S. Patent No. 2,499,368, dated March 7, 1950, to De Groote and Keiser. In said patent such test for emulsification using a water-insoluble solvent, generally xylene, is described as an index of surface activity.

The above mentioned test, i.e., a conventional emulsification test simply means that the preferred product for demulsification is soluble in a solvent having hydrophobe properties or in an oxygenated water-insoluble solvent, or a mixture containing a fraction of such solvent with the proviso that when such solution in a hydrocarbon solvent is shaken with water the product may remain in the nonaqueous solvent, or, for that matter, it may pass into the aqueous solvent. In other words, although it is xylene soluble, for example, it may also be water soluble to an equal or greater degree.

For purpose of convenience what is said hereinafter will be divided into five parts:

Part 1 is concerned with the oxyalkylation of sucrose broadly so as to obtain products within the compositional limits of the herein described invention;

Part 2 is concerned with binary or tertiary products derived from sucrose and a single oxide, or sucrose and two oxides, which may be looked upon as intermediate products. More conveniently, the binary compositions may be considered as sub-intermediates and the tertiary compositional products as intermediates, all of which will be plain in light of the subsequent specification. Such intermediates are reacted with one more component, for instance, ethylene oxide, to give the four-component product.

Part 3 is concerned essentially with the oxyalkylation of the intermediate described in Part 2, preceding. Needless to say, if the intermediate were obtained by the use of butylene oxide and ethylene oxide it would be subjected to oxypropylation; if obtained from butylene oxide and propylene oxide it would be subjected to oxyethylation; and if obtained from propylene oxide and ethylene oxide it would be subjected to oxybutylation.

Part 4 is concerned with the resolution of petroleum emulsions of the water-in-oil type by means of the previously described chemical compounds; and Part 5 is concerned with uses for the products herein described, either as such or after modification, including applications other than those involving the resolution of petroleum emulsions of the water-in-oil type.

PART 1

The present invention is concerned with a cogeneric mixture which is the end product of a reaction or reactions involving 4 reactants. Assuming completeness of reaction and based on a mathematical average, the final product is characterized most conveniently in terms of the 4 component reactants. This phase of the invention is described elsewhere in greater detail.

In representing a mixture or an end product derived from 2 components or 3 components, there is no difficulty as far as using the plane surface of an ordinary printed sheet. For example, a 3-component system is usually represented by a triangle in which the apexes represent 100% of each component and any mixture or reaction product in terms of the 3 components is represented by a point in the triangular area in which the composition is indicated by perpendiculars from such point to the sides.

Chemists and physicists ordinarily characterize a 4-component system by using a solid, i.e., a regular tetrahedron. In this particular presentation each point or apex represents 100% of each of the 4 components, each of the 6 edges represents a line or binary mixture of the 2 components represented by the apexes or points at the end of the line or edge. Each of the 4 triangles or faces represent a tertiary mixture of the 3 components represented by the 3 corners or apexes and obviously signify the complete absence of the 4th component indicated by the corner or apex opposite the triangular face.

However, as soon as one moves to a point within the regular tetrahedron one has definitely characterized and specified a 4-component mixture in which the 4 components add up to 100%. Such a representation of a 4-component system is described in detail in U.S. Patent 2,549,438 to De Groote et al.

The invention will be described by reference to the accompanying drawings, which illustrate, in conventional graphical form, compositions used in accordance with the invention in terms of the four components. In the drawings, Figure 1 is a conventional tetrahedron in which a trapezoidal area is blocked out and which defines the scope of the invention. Figure 2 is a planar figure by which, having a fixed amount of one constituent, the other three may be determined.

Referring now to Figure 1, the composition represented by the block which is really a truncated triangular pyramid is designated by E, H; F, I; and G, J. Bear in mind that the base of the truncated pyramid, that is E, F, G, does not rest on the bottom of the equilateral base triangle. Point D represents 100% ethylene oxide. The base triangle represents the three other components and obviously 0% ethylene oxide. For purpose of what is said herein, the lower base of the truncated pyramid, E, F, G, is a base parallel to the equilateral triangle, but two units up, i.e., representing 2% of ethylene oxide. Similarly, the upper base of the truncated pyramid, H, I, J, lies in a plane which is 39.5 units up from the base, to wit, represents 39.5% ethylene oxide. Specifically, then, this invention is concerned with the use of components in which the ethylene oxide component varies from 2% to 39.5% ethylene oxide. The problem then presented is the determination of the other three components, to wit, butylene oxide, propylene oxide, and sucrose.

Actually, as far as the limiting points in the truncated pyramid are concerned, which has been previously referred to in Figure 1, it will be noted that in the subsequent text there is a complete table giving the composition of these points for each successive range of ethylene oxide. In other words, a perfectly satisfactory representation is available by means of these tables from a practical standpoint without necessarily resorting to the data of Figure 2.

Figure 2 shows a triangle and the three components other than ethylene oxide. These three components added together are less than 100%, to wit, 60.5% to 98%, but for reasons explained are calculated back to 100%. This point is clarified subsequently by examination of the tables. It will be noted that Figure 2 shows a triangle 1, 4 and 6, which represents the bases (top, bottom, or for that matter, intermediate) of the truncated pyramid, also the area in composition which is particularly pertinent to the present invention.

PART 2

As has been previously pointed out, the compositional limits of the herein described compounds are set by a truncated triangular pyramid which appears in Figure 1. It would be immaterial since the figure A, B, C, D is a regular tetrahedron whether one considered A, B, C, as the base, B, C, D, as the base, A, C, D, as the base, or A, B, D, as the base. In order to eliminate repetitious description which is obvious in light of the examples included, we have selected A, B, C as the base. Another reason for so doing is that the preference is to use ethylene oxide as the final component and this selection of A, B, C, as the base lends itself most readily to such presentation.

As has been suggested previously it is simplest to refer to Figure 2 and concern oneself with a 3-component system derived from sucrose, propylene oxide and butylene oxide. Such product can then be reacted with 2% to 39.5% of ethylene oxide based on the final composition so as to give the preferred examples of the instant invention.

Returning now momentarily to the preparation of the 3-component intermediate shown in Figure 2, it is obvious that hardly any directions are required to produce the compounds specified. However, referring to the composition of the initial reactants based on the triangle in the attached drawing, it will be noted that we have calculated the percentage of the three initial reactants for points 1 to 23, inclusive, so as to yield the intermediate derived from sucrose, propylene oxide, and butylene oxide. These points determine not only the triangle but also numerous points within the triangle. Furthermore, the points are selected so the area is divided into five parts, three of which are triangles and two of which are four-sided figures. The triangles are defined by the points 1, 2 and 8; 2, 3 and 8; 5, 6 and 7; and the four-sided figures by the points 3, 4, 5 and 9 and finally 3, 8, 7 and 9.

Note that these data are included in Table I immediately following:

TABLE I

| Points on Boundary of Area | Sucrose, Percent | Propylene Oxide, Percent | Butylene Oxide, Percent | Sucrose, Percent | Propylene Oxide, Percent | Sucrose, Percent | Butylene Oxide, Percent |
|---|---|---|---|---|---|---|---|
| 1 | 1.0 | 86.5 | 12.5 | 1.14 | 98.86 | 7.42 | 92.58 |
| 2 | 1.0 | 63.0 | 36.0 | 1.56 | 98.44 | 2.70 | 97.3 |
| 3 | 1.0 | 50.0 | 49.0 | 1.96 | 98.04 | 2.0 | 98.0 |
| 4 | 1.0 | 24.0 | 75.0 | 4.0 | 96.0 | 1.32 | 98.68 |
| 5 | 21.0 | 21.0 | 58.0 | 50.0 | 50.0 | 26.55 | 73.45 |
| 6 | 48.5 | 17.0 | 34.5 | 74.5 | 25.5 | 58.4 | 41.6 |
| 7 | 36.0 | 36.0 | 28.0 | 50.0 | 50.0 | 56.3 | 43.7 |
| 8 | 22.5 | 55.0 | 22.5 | 29.0 | 71.0 | 50.0 | 50.0 |
| 9 | 33.0 | 33.0 | 34.0 | 50.0 | 50.0 | 49.2 | 50.8 |
| 10 | 4.0 | 27.5 | 68.5 | 12.7 | 87.3 | 5.52 | 94.48 |
| 11 | 3.5 | 38.5 | 58.5 | 8.45 | 91.55 | 5.68 | 94.32 |
| 12 | 2.5 | 55.0 | 42.5 | 4.35 | 95.65 | 5.56 | 94.44 |
| 13 | 2.5 | 59.0 | 48.5 | 4.06 | 95.94 | 4.9 | 95.1 |
| 14 | 3.0 | 68.5 | 28.5 | 4.18 | 95.82 | 9.52 | 90.48 |
| 15 | 3.0 | 75.0 | 22.0 | 3.85 | 96.15 | 12.0 | 88.0 |
| 16 | 2.5 | 83.0 | 14.5 | 2.92 | 97.08 | 14.7 | 85.3 |
| 17 | 7.5 | 17.5 | 75.0 | 30.0 | 70.0 | 9.1 | 90.9 |
| 18 | 14.0 | 22.5 | 63.5 | 38.3 | 61.7 | 18.05 | 81.95 |
| 19 | 24.0 | 48.5 | 27.5 | 33.1 | 66.9 | 46.6 | 53.4 |
| 20 | 41.5 | 25.5 | 33.0 | 61.8 | 38.2 | 55.7 | 44.3 |
| 21 | 27.5 | 51.5 | 21.0 | 34.8 | 65.2 | 56.6 | 43.4 |
| 22 | 21.5 | 45.5 | 33.0 | 32.0 | 68.0 | 39.4 | 60.6 |
| 23 | 17.0 | 27.0 | 56.0 | 38.5 | 61.4 | 23.3 | 76.7 |

Note the first column gives various points on the boundary of the triangle or within the triangle. Note the next three columns represent the tertiary mixture corresponding to the initial reactants, i.e., the intermediate. These values represent percentages, by weight, of sucrose, butylene oxide and propylene oxide. Thus, it is apparent that one can select any particular point in Figure 2 and simply use the appropriate amount of oxide to obtain the selected intermediate. For instance, in regard to point 1, all that would be necessary would be to mix 86.5 pounds of propylene oxide with 12.5 pounds of butylene oxide and use the mixture to oxyalkylate one pound of sucrose.

Similarly, in point 2, one need only mix 63 pounds of propylene oxide with 36 pounds of butylene oxide and use the mixture to oxyalkylate one pound of sucrose in a manner previously indicated.

Note that the fifth and sixth columns represent binary mixtures; for instance, in regard to the various points on the triangle and within the triangle we have calculated the initial mixture using sucrose and propylene oxide in the first place and using sucrose and butylene oxide in the second place, which could be employed for subsequent oxyalkylation to give the particular composition required. Stated another way, we have calculated the composition for the sub-intermediates which, when reacted with the other oxide, propylene oxide or butylene oxide as the case may be, give the intermediate, i.e., the three-component product.

Note that a binary intermediate for the preparation of point 1 can be prepared in any suitable manner involving 1.14 pounds of sucrose and 98.86 pounds of propylene oxide.

Referring now to the tertiary mixture table, it is apparent that for point 1 sucrose and propylene oxide together represent 87.5% and butylene oxide 12.5%. Therefore, one could employ 87.5 pounds of the binary mixture (a sub-intermediate) and react it with 12½ pounds of butylene oxide to give the three-component product (the intermediate).

Similarly, in regard to the fifth and six columns, the mixture involved sucrose and propylene oxide. One could employ 1.56 pounds of sucrose and 98.44 pounds of propylene oxide. Such mixture need only be reacted with butylene oxide in the proportion of 64 pounds of such mixture and 36 pounds of butylene oxide to give the desired 3-component product. This is obvious from the data in regard to the tertiary mixtures.

Referring now to columns 7 and 8, it is obvious one could produce an oxybutylated sucrose and then subject it to reaction with propylene oxide. Using this procedure in regard to point one, it is obvious the mixture is obtained by 7.42 pounds of sucrose and 92.58 pounds of butylene oxide. This product can then be subjected to reaction with propylene oxide in the ratio of 13.5 pounds of the mixture and 86.5 pounds of propylene oxide. Similarly, in regard to point two, it is obvious that one can react 2.70 pounds of sucrose with 97.3 pounds of butylene oxide. 37 pounds of this mixture can then be reacted with 63 pounds of propylene oxide.

As previously pointed out, the oxyalkylation of sucrose has been described in the literature and is described also in detail above. All one need do is employ such conventional oxyalkylation procedure to obtain products corresponding to the compositions as defined. Attention is again directed to the fact that one need not add the entire amount of either oxide at one time but that a small portion of one could be added and then another small portion of the other, and the process repeated.

For purpose of illustration, we have prepared examples three different ways corresponding to the compositions of the so-called intermediate in Figure 2. In the first series, butylene oxide and ethylene oxide were mixed; this series is indicated as $1a$, $2a$, $3a$, through and including $23a$; in the second series, which represents our preferred procedure, butylene oxide was used first, followed by propylene oxide. This series has been indicated as $1b$, $2b$, $3b$, through and including $23b$. Finally, in the third series propylene oxide was used first, followed by butylene oxide and the series identified as $1c$, $2c$, $3c$, through and including $23c$;

TABLE II

| Composition Corresponding to following Point | Composition where Oxides are Mixed Prior to Oxyalkylation | Composition where Butylene Oxide used first followed by Propylene Oxide | Composition where Propylene Oxide used first followed by Butylene Oxide |
|---|---|---|---|
| 1 | $1a$ | $1b$ | $1c$ |
| 2 | $2a$ | $2b$ | $2c$ |
| 3 | $3a$ | $3b$ | $3c$ |
| 4 | $4a$ | $4b$ | $4c$ |
| 5 | $5a$ | $5b$ | $5c$ |
| 6 | $6a$ | $6b$ | $6c$ |
| 7 | $7a$ | $7b$ | $7c$ |
| 8 | $8a$ | $8b$ | $8c$ |
| 9 | $9a$ | $9b$ | $9c$ |
| 10 | $10a$ | $10b$ | $10c$ |
| 11 | $11a$ | $11b$ | $11c$ |
| 12 | $12a$ | $12b$ | $12c$ |
| 13 | $13a$ | $13b$ | $13c$ |
| 14 | $14a$ | $14b$ | $14c$ |
| 15 | $15a$ | $15b$ | $15c$ |
| 16 | $16a$ | $16b$ | $16c$ |
| 17 | $17a$ | $17b$ | $17c$ |
| 18 | $18a$ | $18b$ | $18c$ |
| 19 | $19a$ | $19b$ | $19c$ |
| 20 | $20a$ | $20b$ | $20c$ |
| 21 | $21a$ | $21b$ | $21c$ |
| 22 | $22a$ | $22b$ | $22c$ |
| 23 | $23a$ | $23b$ | $23c$ |

The products illustrated by the preceding examples are not, of course, the final products of the present invention. They represent intermediates. However, such intermediates require treatment with ethylene oxide to yield the product of the present invention.

PART 3

In Part 2 preceding there has been described the preparation of sub-intermediates and intermediates. As previously noted, these intermediates need only be subjected to conventional oxyethylation to produce the products described in the present invention. The amount of ethylene oxide employed is such that the final composition conforms to the composition set forth in Figure 1. This means that the amount of ethylene oxide used as a reactant represents 2% to 39.5% of the final product with the proviso that the remainder of the product is represented by the three remaining components within the proportions set forth in Figure 2.

In preparing examples we have done nothing more except use conventional oxyethylation, using an alkaline catalyst such as powdered caustic soda or sodium methylate. We have operated at temperatures varying from 110° C. to 135° C. We have used oxyethylation pressures of 10 pounds per square inch up to 30 pounds per square inch, but usually not over 15 pounds per square inch. The time period has varied from 15 minutes when just a small amount of oxide was employed, up to as much as 4 to 6 hours when a larger amount of oxide was used.

Obviously the simplest of calculations is involved although we have given the data in tabular form for the reason that we have indicated that the product containing 2% of ethylene oxide carries the designation A; the one having 5% ethylene oxide carries the designation B; the one having 10% ethylene oxide is C; the one having 15% is D; the one having 20% is E; and the one having 25% is F. Similarly, designations G, H, I, J, K, and L are products containing 27.5% to 39.5% of ethylene oxide, respectively, as shown in Table III.

TABLE III.—PROPORTIONS BY WEIGHT

| Ex. No. | Ethylene Oxide | 3-Component Intermediate of Part 2, Preceding | Designation |
|---|---|---|---|
| 1 | 2 | 98 | A. |
| 2 | 3 | 97 | |
| 3 | 4 | 96 | |
| 4 | 5 | 95 | B. |
| 5 | 6 | 94 | |
| 6 | 7 | 93 | |
| 7 | 8 | 92 | |
| 8 | 9 | 91 | |
| 9 | 10 | 90 | C. |
| 10 | 11 | 89 | |
| 11 | 12 | 88 | |
| 12 | 13 | 87 | |
| 13 | 14 | 86 | |
| 14 | 15 | 85 | D. |
| 15 | 16 | 84 | |
| 16 | 17 | 83 | |
| 17 | 18 | 82 | |
| 18 | 19 | 81 | |
| 19 | 20 | 80 | E. |
| 20 | 21 | 79 | |
| 21 | 22 | 78 | |
| 22 | 23 | 77 | |
| 23 | 24 | 76 | |
| 24 | 25 | 75 | F. |
| 25 | 27.5 | 72.5 | G. |
| 26 | 30.0 | 70 | H. |
| 27 | 32.5 | 67.5 | I. |
| 28 | 35.0 | 65 | J. |
| 29 | 37.5 | 62.5 | K. |
| 30 | 39.5 | 60.5 | L. |

Since it would be impossible to prepare all the variants which have been previously suggested, we have proceeded as follows: We have prepared 30 examples corresponding to the 23 points in Figure 2 by varying the amount of ethylene oxide from 2% to 39.5%. One example we have used 2%, another 5%, another 10%, another 15%, another 20% and another 25%, and on up to 39.5%, as shown. The intermediates used are those described in Table II, preceding. The prepared products have been described as follows: A–1a, B–2b, C–3c, D–4a, etc. A–1a is, of course, the product obtained by using 98% of intermediate 1a previously described in Table II, and 2%, by weight, of ethylene oxide; Example B–2b is obviously obtained by reacting 95%, by weight, of intermediate 2b with 5%, by weight, of ethylene oxide. Example C–3c is obtained by reacting 90%, by weight, of intermediate 3c with 10%, by weight, of ethylene oxide. Example D–4a is obtained by reacting 85% of intermediate 4a with 15%, by weight, of ethylene oxide. Example E–5b is obtained by reacting 80% of intermediate 5b with 20%, by weight, of ethylene oxide. Example F–6c is obtained by reacting 75% of intermediate 6c with 25% of ethylene oxide.

It will be noted that the last series of 7 examples in Table IV are concerned with compositions corresponding to points 1, 5, 10, 15, 16, 20 and 23 in Figure 2. In these instances the compound having the F designation has 25% ethylene oxide; the one with a G designation has 27½%; the one with the H designation, 30%; the one with the I designation, 32½%; the one with the J designation, 35%; the one with the K designation, 37½%; and the one with the L designation 39½%. Note that in one instance the table shows all three types of preparation, that is in the instance of J16a, J16b, and J16c. The remaining examples in Table IV, following, are self-explanatory.

TABLE IV

| Composition Corresponding to following Point | Composition where Oxides are Mixed Prior to Oxyalkylation | Composition where Butylene Oxide used first followed by Propylene Oxide | Composition where Propylene Oxide used first followed by Butylene Oxide |
|---|---|---|---|
| 1 | A–1a | 1b | 1c |
| 2 | 2a | B–2b | 2c |
| 3 | 3a | 3b | C–3c |
| 4 | D–4a | 4b | 4c |
| 5 | 5a | E–5b | 5c |
| 6 | 6a | 6b | F–6c |
| 7 | A–7a | 7b | 7c |
| 8 | 8a | B–8b | 8c |
| 9 | 9a | 9b | C–9c |
| 10 | D–10a | 10b | 10c |
| 11 | 11a | E–11b | 11c |
| 12 | 12a | 12b | F–12c |
| 13 | A–13a | 13b | 13c |
| 14 | 14a | B–14b | 14c |
| 15 | 15a | 15b | C–15c |
| 16 | D–16a | 16b | 16c |
| 17 | 17a | E–17b | 17c |
| 18 | 18a | 18b | F–18c |
| 19 | A–19a | 19b | 19c |
| 20 | 20a | B–20b | 20c |
| 21 | 21a | 21b | C–21c |
| 22 | D–22a | 22b | 22c |
| 23 | 23a | E–23b | 23c |
| 1 | 1a | 1b | F–1c |
| 5 | G–5a | 5b | 5c |
| 10 | 10a | H–10b | 10c |
| 15 | 15a | 15b | I–15c |
| 16 | J–16a | J–16b | J–16c |
| 20 | 20a | K–20b | 20c |
| 23 | 23a | 23b | L–23c |

The same procedures have been employed using other butylene oxides including mixtures having considerable isobutylene oxide and mixtures of the straight chain isomers with greater or lesser amount of the 2,3 isomer. Where reference has been made in previous examples to the straight chain isomer, the product used was one which was roughly 85% or more of the 1,2 isomer and approximately 15% of the 2,3-cis- and the 2,3-trans-isomer with substantially none or not over 1% of the isobutylene oxide.

In the preceding procedures one oxide has been added and then the other. One need not follow this procedure. The three oxides can be mixed together in suitable proportions and subsequently subjected to joint oxyalkylation so as to obtain products coming within the specified limits. In such instances, of course, the oxyalkylation may be described as random oxyalkylation insofar that one cannot determine the exact location of the butylene oxide, propylene oxide or ethylene oxide groups. In such instances the procedure again is identically the same as previously described, and, as a matter of fact, we have used such methods in connection with powdered sucrose.

If desired, one may add part of one oxide and then all the others and then return to the use of the first oxide. For example, one might use the procedure previously suggested, adding some butylene oxide, all the propylene oxide, all the ethylene oxide and then the remainder of the butylene oxide. Or, inversely, one may add some propylene oxide, then all the butylene oxide, then the remainder of the propylene oxide, and then the ethylene oxide. Or, any one of the three oxides could be added in portions so one oxide is added first, then the other two, then the first oxide is added again, then the other two. We have found no advantage in so doing; indeed, our preference has been to add all the butylene oxide first, then all the propylene oxide, and then the required amount of ethylene oxide.

As previously pointed out, sucrose can be oxyethylated in the same way it is oxybutylated, i.e., by powdering the sucrose, using a suitable catalyst, particularly an alkaline catalyst, and adding the ethylene oxide. The changes previously mentioned are of difference in degree only. In other words, oxyethylation will take place at a lower temperature, for instance, a top temperature of probably 110° to 135° C. instead of 145° to 150° C.

The same weight of ethylene oxide could be added in 75% to 85% of the time required for butylene oxide. The pressure during the reaction, instead of being 20 to 35 pounds as in the case of butylene oxide, is apt to be 10 to 30 pounds and at times a little higher, but frequently operates at 15 pounds per square inch or less. Otherwise, there is no difference. Note, however, that it is easier and preferable to oxyethylate last, i.e., have a liquid reaction product obtained by the use of butylene oxide or propylene oxide, or a combination of the two before the oxyethylation step.

Also, if desired, the use of ethylene carbonate is a very convenient way of oxyethylating sucrose. In fact, it can be oxyethylated without the use of pressure.

One can oxyalkylate using an acid catalyst or an alkaline catalyst or at least in part, without the use of any catalyst although such procedure is extremely slow and uneconomical. In other words, any one of the conventional catalysts used in oxyalkylation may be employed. It is our preference, however, to use an alkaline catalyst such as sodium methylate, caustic soda, or the like.

Actually, powdered sucrose may contain 1%, or somewhat less, of water. When such powder is heated to 140° to 150° and subjected to vacuum, particularly when anhydrous nitrogen is passed through the melted mass, the resultant product appears to become substantially water free. Even so, there may be a few tenths of a percent and perhaps only a trace of water remaining in some instances.

The products obtained by the above procedure usually show some color varying from a light amber to a pale straw. They can be bleached in the usual fashion, using bleaching clays, charcoal, or an organic bleach, such as peroxide or peracetic acid, or the like.

Such products also have present a small amount of alkaline catalyst which can be removed by conventional means, or they can be neutralized by adding an equivalent amount of acid, such as hydrochloric acid. For many purposes the slight amount of residual alkalinity is not objectionable.

There are certain variants which can be employed without detracting from the metes and bounds of the invention, but for all practical purposes there is nothing to be gained by such variants and the result is merely increased cost. For instance, any one of the two oxides can be replaced to a minor percentage and usually to a very small degree, by an oxide which would introduce substantially the same group along with a side chain, for instance, one could employ glycidyl methyl ether, glycidyl ethyl ether, glycidyl isopropyl ether, glycidyl butyl ether or the like.

In the hereto appended claims reference has been made to "glycol ethers of sucrose." Actually, it well may be that the products should be referred to as "polyol ethers of sucrose" in order to emphasize the fact that the final products of reaction have more than two hydroxyl radicals. However, the products may be considered as hypothetically derived by reaction of sucrose with the glycols, such as ethylene glycol, butylene glycol, propylene glycol, or polyglycols. For this reason there seems to be a preference to use the terminology "glycol ethers of sucrose."

PART 4

As to the use of conventional demulsifying agents, reference is made to U.S. Patent No. 2,626,929, dated January 7, 1953, to De Groote, and particularly to Part Three. Everything that appears therein applies with equal force and effect to the instance process, noting only that where reference is made to Example 13b in said text beginning in column 15 and ending in column 18, reference should be to Example J–16b, herein described.

PART 5

The compounds derived in the manner previously described, may be used as such for breaking petroleum emulsions of the water-in-oil type. They also can be converted into derivatives of the kind subsequently described which also may be used for this same purpose. Such derivatives are useful for other purposes including the same purpose for which the herein described products are effective. The herein described products may be used for various purposes where detergents, common solvents, emulsifiers, and the like are used. They may be used as lubricants and as additives to fluids used in hydraulic brake systems; they may be used as emulsifying agents to emulsify or remove greases or dirt; they may be used in the manufacture of a variety of other materials such as soluble oils, insecticide sprays, etc.

These products may be combined with a variety of reactants as chemical intermediates, for instance, with various diepoxides or polyepoxides. They may be combined with a number of other monoepoxides, such as epichlorohydrin, styrene oxide, glycide and methylglycide. They may be reacted with allyl glycidyl ether, glycidyl isopropyl ether, and glycidyl phenyl ether.

Furthermore, such products may be reacted with alkylene imines, such as ethylene imine or propylene imine, to produce cation-active materials. Instead of an imine, one may employ what is a somewhat equivalent material, to wit, a dialkylaminoepoxypropane of the structure

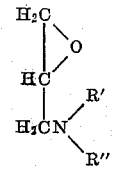

wherein R' and R" are alkyl groups.

The products may be combined with carboxy acids, such as higher fatty acids, so as to change their characteristics or with polycarboxy acids, such as diglycolic, maleic acid, phthalic acid, succinic acid, and the like, to give resins, soft polymers, or fractional esters which are essentially monomeric. Such products and others herein described, may all be used for the resolution of petroleum emulsions of the water-in-oil type. The products without further reaction are particularly valuable as additives for lubricating oils which are derived from sources other than petroleum.

The addition of the oxyalkylene chain, and particularly the oxypropylene chain, to polyols produces effects at times impossible to predict and even difficult to evaluate after being recognized. For instance, the reaction of sucrose with propylene oxide to yield a hydroxylated material which can be reacted with polycarboxy acids, particularly dicarboxy acids, to give fractional esters or polymers is well known. Such products are excellent demulsifying agents. Certain polyols particularly having 3 or more hydroxyls, as for example sucrose, when reacted with 33 to 50 parts by weight of propylene oxide yield derivatives which without any further reaction of any kind are effective demulsifying agents. Such derivatives are also effective for other purposes, such as an anti-fogging agent in motor fuels, a coagulation preventive in burner oils, and as an additive for the prevention of corrosion of ferrous metals. Such invention, however, is not part of what is herein claimed.

The herein described products and the derivatives thereof are particularly valuable in flooding processes for recovery of oil from subterranean oil-bearing strata when employed in the manner described in U.S. Patent No. 2,233,381 dated February 25, 1941, to De Groote and Keiser.

Having thus described our invention, what we claim as new and desire to obtain by Letters Patent is:

1. A cogeneric mixture of a homologous series of glycol ethers of sucrose; said cogeneric mixture being derived exclusively from sucrose, butylene oxide, propylene oxide, and ethylene oxide in such weight proportions so that the average composition of said cogeneric mixture, stated in terms of the initial reactants, is such that the percentage of ethylene oxide is within the limits of 2% to 39.5% by weight, and the remaining three initial reactants recalculated to 100% basis lie approximately within the triangle defined in Figure 2 by points 1, 4, and 6.

2. The cogeneric mixture of claim 1 with the proviso that the reactant composition falls within the triangle defined by points 1, 2 and 8 in Figure 2.

3. The cogeneric mixture of claim 1 with the proviso that the reactant composition falls within the triangle defined by points 2, 3 and 8 in Figure 2.

4. The cogeneric mixture of claim 1 with the proviso that the reactant composition falls within the four-sided figure defined by points 8, 3, 9 and 7.

5. The cogeneric mixture of claim 1 with the proviso that the reactant composition falls within the four-sided figure defined by points 3, 4, 5 and 9.

6. The cogeneric mixture of claim 1 with the proviso that the reactant composition falls within the triangle defined by points 5, 6 and 7.

7. The cogeneric mixture of claim 1 wherein the butylene oxide is a straight chain butylene oxide and the oxybutylene radicals are linked to the sucrose.

References Cited in the file of this patent

UNITED STATES PATENTS

| | | |
|---|---|---|
| 2,572,885 | De Groote et al. | Oct. 30, 1951 |
| 2,574,544 | De Groote | Nov. 13, 1951 |
| 2,602,051 | De Groote | July 1, 1952 |

OTHER REFERENCES

Pigman et al.: Chemistry of the Carbohydrates, 1948, publ. by Academic Press Inc. (New York), page 556.